United States Patent [19]

Klomp

[11] Patent Number: 4,969,424

[45] Date of Patent: Nov. 13, 1990

[54] ELECTROMAGNETIC DIAPHRAGM VALVE

[75] Inventor: Edward D. Klomp, Mount Clemens, Mich.

[73] Assignee: General Motors Corporation, Detroit, Mich.

[21] Appl. No.: 369,221

[22] Filed: Jun. 21, 1989

[51] Int. Cl.⁵ .................. F16K 31/06; F02B 33/02
[52] U.S. Cl. ................................. 123/73 V; 251/75; 251/129.1
[58] Field of Search .................. 251/75, 129.1; 123/73 V

[56] References Cited

U.S. PATENT DOCUMENTS

| | | | |
|---|---|---|---|
| 3,069,125 | 12/1962 | Hewitt, Jr. | 251/75 X |
| 3,426,800 | 2/1969 | Bauer | 251/75 X |
| 3,635,438 | 1/1972 | Peters | 251/129.1 |
| 4,223,648 | 9/1980 | Pozniak et al. | |
| 4,829,947 | 5/1989 | Lequesne | |

Primary Examiner—Arnold Rosenthal
Attorney, Agent, or Firm—Robert J. Outland

[57] ABSTRACT

A diaphragm valve includes a magnetically attractive snap disc with two unrestrained positions in one of which its edge contacts a valve seat to block flow and an electromagnet operates to urge the disc to end of its two positions with additional means for returning it to the other. Use of a valve for two cycle engine crankcase inlet control is also disclosed.

4 Claims, 2 Drawing Sheets

4,969,424

ELECTROMAGNETIC DIAPHRAGM VALVE

TECHNICAL FIELD

This invention relates to flow control valves and more particularly to disc type valves. In preferred embodiments, the invention relates to electromagnetically actuated diaphragm valves and to the a use of such valves to control air admission to a two cycle engine crankcase.

BACKGROUND AND SUMMARY OF THE INVENTION

It is known in the art to use a disc or diaphragm valve to control fluid flow. However, the advantages of an electromagnetically actuated diaphragm valve and applications thereof, such as for crankcase inlet control of a two cycle engine, have apparently not been previously known. Actuation of a flow-control valve by means of an electromagnet provides convenience and flexibility difficult if not impossible to match. However, the use of electromagnets may be complicated by trade-offs in movement between the on and off positions, electrical power, initiating force and overall size.

A well-known diaphragm-type spring application is in the conventional and familiar household oil can, where the perimeter is fixed and the center is deflected. The spring has about the desired load-deflection characteristic for the applications to be described and the spring itself is in contact with the fluid medium to be controlled. However, the device functions as a pump where the volume and rate of flow are determined by the diaphragm position and rate of deflection.

The present invention employs a diaphragm functioning only as a valve which seals a flow path. Diaphragm-type springs have been employed for many years where compactness in the direction of loading and the peculiar variety of load-deflection characteristics available are desired spring design features. The diaphragm spring is also known as a Bellville, disc or ring spring. For a valve application, the type of load-deflection characteristic desired is shown in FIG. 1. Although a perfectly symmetrical characteristic is shown, this need not be an important requirement.

The embodiments to be described employ one or more relatively thin sheet segments of variously shaped resilient, flexible material, as a disc, which performs the sealing function of a valve and may provide the springiness required to return the thin sheet valve to its null or closed position. Furthermore, each valve disc is preformed to introduce internal stresses that permit the valve to assume either of two equilibrium positions. Because of its relative thinness, this type of valve will be referred to as a diaphragm valve. Preferred actuation is by an electromagnet, but other force generators, such as a fluid mechanical pressure difference, are also possibilities.

These and other features and advantages of the invention will be more fully understood from the following description of certain specific embodiments of the invention taken together with the accompanying drawings.

BRIEF DRAWING DESCRIPTION

DETAILED DESCRIPTION

Figure 1:
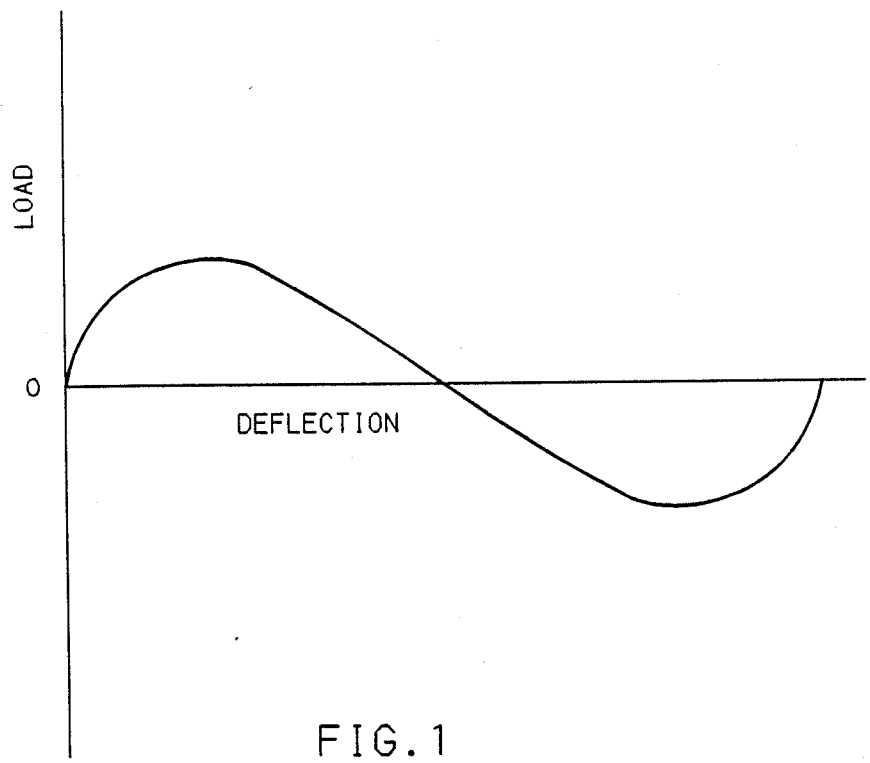
FIG. 1 is a load-deflection curve for a diaphragm type spring.
Figure 2:
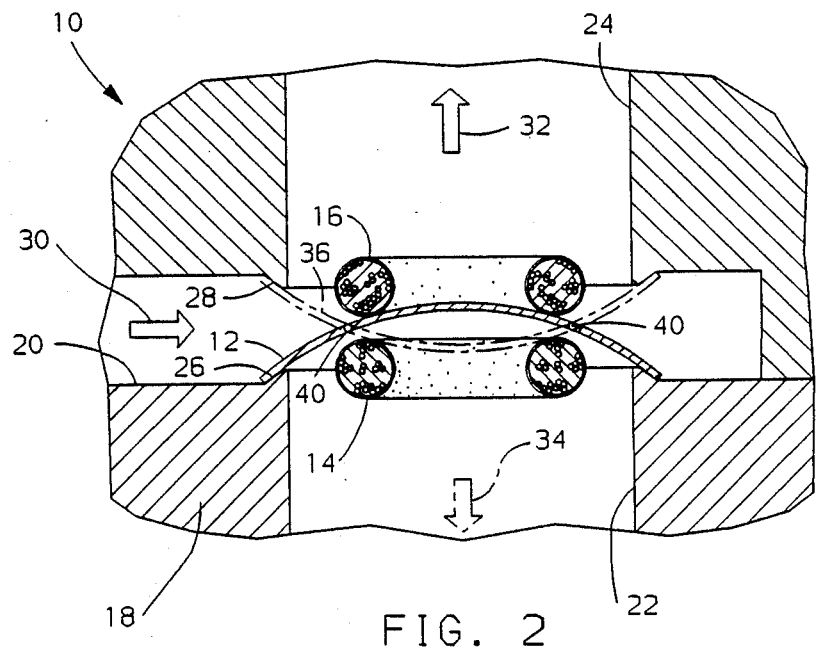
FIG. 2 is a schematic view showing one embodiment of electromatic diaphragm valve according to the invention.

Referring now to the drawings in detail, a simple configuration of the invention employing a diaphragm spring in a valve 10 actuated by an electromagnet is shown schematically in FIG. 2. The key elements are a diaphragm spring comprising a dished steel sheet metal disc 12 having approximately the shape of a segment of an ellipsoid, annular coils 14, 16, which when energized become electromagnets, a housing 18, which provides a single annular entrance 20 and two exit flow ports 22, 24, plus support, not shown, for the coils and seats 26, 28 for the spring valve. FIG. 2 shows the valve disc 12 seated on valve seat 26 to direct an entering flow (arrow 30) toward the exit path (arrow 32) through port 24. Sealing of the path (arrow 34) through port 22 is assured by adjusting the housing of coil 16 to physically force the spring surface at the outer diameter against seat 26. No electrical current is necessary to maintain this flow direction, i.e., from the inlet to exit path 32. When flow is desired to path 34, instead of path 32, coil 14 is energized, attracting the diaphragm spring 12 and causing it to deflect to the position shown by dashed line 36. By proper adjustment, the spring will exert the force desired against valve seat 28 and coil housing 14 when it comes to rest. Of course, the power to coil 14 may be interrupted as soon as the spring deflection to position 36 has been assured. In order to minimize friction and wear, the coil housings should be shaped to encourage rolling of the diaphragm on the electromagnet housing surfaces during spring transitions. Also, the valve seats should be contoured to permit diaphragm lift off from the seat surface to minimize or eliminate rubbing.

Coil location should be somewhat inside the nodal diameter 40 that defines a fixed annulus relative to movement of the valve disc 12. The trade-off is between the force necessary to cause deflection and the magnitude of the deflection. If the electromagnet housings were located at the nodal diameter, they would both be in contact with the diaphragm and no diaphragm motion could be initiated irrespective of force magnitude. The other extreme is location of the magnets at zero diameter, i.e., on the centerline. Here the force required for deflection is a minimum, but the deflection is a maximum. Since the force exerted by an electromagnet falls exponentially with distance, this location could demand use of a solenoid with the core or plunger in contact with the diaphragm.

Figure 3:
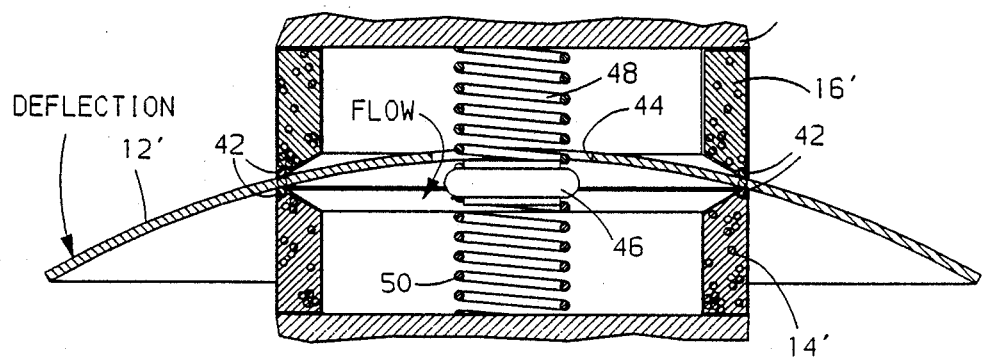
FIG. 3 is schematic view of an alternative embodiment of valve including a motion damper.

In the example of FIG. 2, the diaphragm is supported at nodal position 40 between the center and the outer diameter so that both the edge and center deflect. If a housing were used to encase the coils, as shown schematically in FIG. 3, it would be possible to damp the motion of the diaphragm 12' to provide a softer, less noisy seating. In the example of FIG. 3, a gap between coils 14', 16' in a damper housing 41 is sealed, e.g., by "O" rings 42. A central hole 44 in the diaphragm permits flow from one side of the diaphragm to the other during deflection. The instantaneous flow rate is controlled by a spring-loaded plug 46 supported by springs 48, 50 and shown in FIG. 3. As the diaphragm 12, is deflected, it approaches the plug 46, reducing the flow area and concomitantly stretching the upper 48 and compressing the lower 50 spring. After the diaphragm has reached its new position, the residual spring forces act on the plug 46 and return it to its neutral position ready for the next event.

My U.S. patent application Ser. No. 369,218 filed 21 June 1989 discloses advantages of replacing the usual reed valves for each cylinder of a crankcase-scavenged two-stroke-cycle engine with a positively actuated flow control valve.

Figure 4:
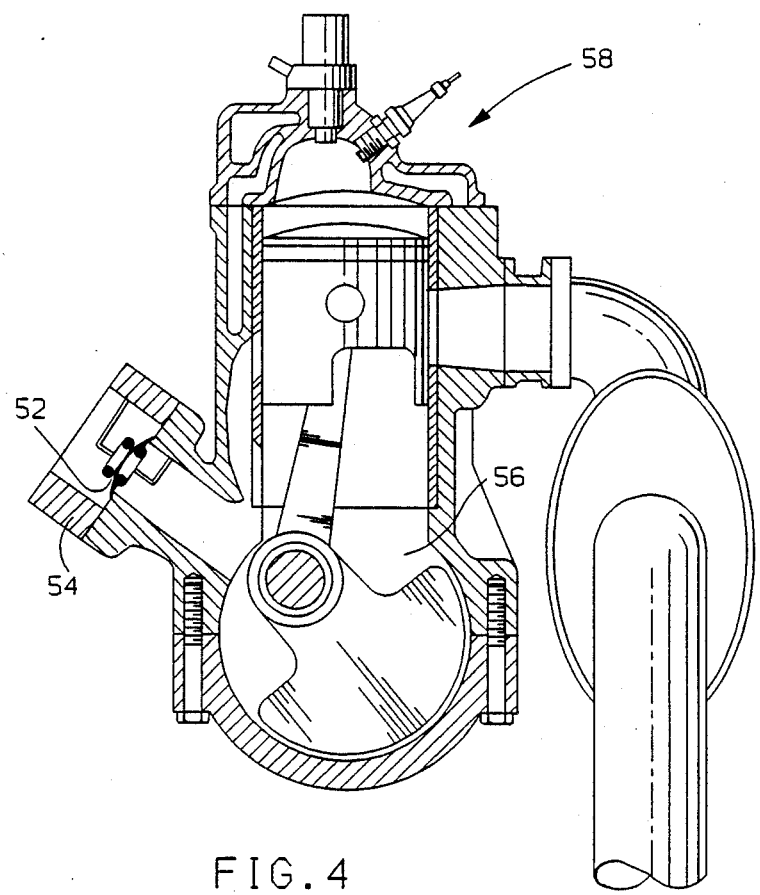
FIG. 4 is a cross-sectional view of a two cycle engine having an electromagnetic crankcase inlet valve according to the invention.

The diaphragm valve appears to be a prime candidate for this application. FIG. 4 shows the installation of a valve 52 similar to that depicted in FIG. 2 in the inlet 54 to the crankcase 56 of a two-stroke-cycle engine 58. A suitable electronic control system, not shown, is needed to supply the electrical current to switch the valve from one position to the other.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

I claim:

1. A diaphragm valve comprising
   passage means having a valve seat therearound,
   a dished snap disc made of magnetically attractive material and having a snap nodal annulus intermediate the center and the edge of the disc,
   said disc being adjacent the valve seat and movable into two oppositely dished unrestrained positions in one of which the edge of the disc seats upon the valve seat to block flow therethrough and in the other of which said edge is spaced from the seat to permit flow,
   electromagnet means axially adjacent one side of the disc and operable to magnetically attract axially a portion of the disc radially spaced from the nodel annulus to urge the disc into one of said positions, and
   return means for subsequently returning the disc to the other of said positions.

2. A diaphragm valve as in claim 1 wherein said return means comprises additional electromagnet means axially adjacent the other side of the disc.

3. A diaphragm valve as in claim 1 and further comprising damping means cooperating with the disc to slow the motion thereof during at least its seating motion to minimize wear and noise.

4. A crankcase scavenged two cycle engine having a crankcase air inlet opening, and
   an electromagnetically actuated diaphragm valve mounted in said inlet opening to control the flow of inlet air between the crankcase interior and the engine exterior, wherein said diaphragm valve includes
   passage means having a valve seat therearound,
   a dished snap disc made of magnetically attractive material and having a snap nodal annulus intermediate the center and the edge of the disc,
   said disc being adjacent the valve seat and movable into two oppositely dished unrestrained positions in one of which the edge of the disc seats upon the valve seat to block flow therethrough and in the other of which said edge is spaced from the seat to permit flow,
   electromagnet means axially adjacent one side of the disc and operable to magnetically attract axially a portion of the disc radially spaced from the nodal annulus to urge the disc into one of said positions, and
   return means for subsequently returning the disc to the other of said positions.

* * * * *